(12) United States Patent
Irving et al.

(10) Patent No.: US 12,097,084 B2
(45) Date of Patent: Sep. 24, 2024

(54) AUTOMATIC ACTIVATION OF FLUSHING MODE IN DENTAL SYSTEMS

(71) Applicant: A-Dec, Inc., Newberg, OR (US)

(72) Inventors: Michael Irving, Newberg, OR (US); Bradley Nelson, Newberg, OR (US); Brett Peterson, Newberg, OR (US); Spencer Warneke, Newberg, OR (US)

(73) Assignee: A-dec, Inc., Newberg, OR (US)

( * ) Notice: Subject to any disclaimer, the term of this patent is extended or adjusted under 35 U.S.C. 154(b) by 838 days.

(21) Appl. No.: 17/139,744

(22) Filed: Dec. 31, 2020

(65) Prior Publication Data
US 2022/0202545 A1 Jun. 30, 2022

(51) Int. Cl.
*A61C 17/02* (2006.01)
*A61C 19/00* (2006.01)
*A61C 1/00* (2006.01)

(52) U.S. Cl.
CPC ...... *A61C 17/0202* (2013.01); *A61C 17/0205* (2013.01); *A61C 19/002* (2013.01); *A61C 1/0076* (2013.01)

(58) Field of Classification Search
CPC . A61C 17/0202; A61C 17/0205; A61C 17/02; A61C 17/14; A61C 17/00; A61C 19/002; A61C 19/00; A61C 1/0076; A61C 1/0061; A61C 1/00; A61C 1/052; A61L 2/18; A61L 2/24
USPC ............................................................ 433/25
See application file for complete search history.

(56) References Cited

U.S. PATENT DOCUMENTS

| 4,545,956 A | * | 10/1985 | Ciszewski ................. A61L 2/18 210/764 |
| 5,785,523 A | | 7/1998 | Overmyer |
| 2002/0033362 A1 | | 3/2002 | Castellini |
| 2019/0336244 A1 | | 11/2019 | Moesslang et al. |

(Continued)

FOREIGN PATENT DOCUMENTS

| EP | 0233847 | 8/1987 | |
| WO | WO98/24007 | 6/1998 | |
| WO | WO-9824007 A1 * | 6/1998 | ........... B08B 9/0325 |

OTHER PUBLICATIONS

Communication Relating to the Results of the Partial International Search and Provisional Opinion Accompanying the Partial Search Results for PCT/US2021/063631, mailed Apr. 5, 2022.

(Continued)

*Primary Examiner* — Ralph A Lewis
*Assistant Examiner* — Mirayda A Aponte
(74) *Attorney, Agent, or Firm* — Klarquist Sparkman, LLP

(57) ABSTRACT

A method for automatically initiating a dental handpiece waterline flushing mode in a dental delivery system includes detecting whether at least first and second handpiece waterlines from a plurality of handpiece waterlines are removed from respective first and second rest positions of a control head for the dental delivery system. According to some implementations, if it is determined that no additional dental handpiece waterline which is flushable remains in a rest position of the control head, then the dental handpiece waterline flushing mode is automatically initiated for the first and second dental handpiece waterlines. In some implementations, a display is updated to provide information to a user, and an input from the user is received to begin flushing.

20 Claims, 9 Drawing Sheets

(56) References Cited

U.S. PATENT DOCUMENTS

2020/0297455 A1    9/2020  Bergheim et al.
2020/0330182 A1*   10/2020 Williams ........... A61C 17/0217

OTHER PUBLICATIONS

International Search Report and Written Opinion for PCT/US2021/063631, mailed Jul. 7, 2022.
Dentsply Sirona, "Teneo," brochure, downloaded from dstreatmentcenters.com/teneo, pp. 1-7 (downloaded on Nov. 27, 2020).
Planmeca, "Planmeca Sovereign Classic Maintenance and infection control,"brochure, downloaded from planmeca.com, pp. 1-4 (downloaded on Dec. 22, 2020).

* cited by examiner

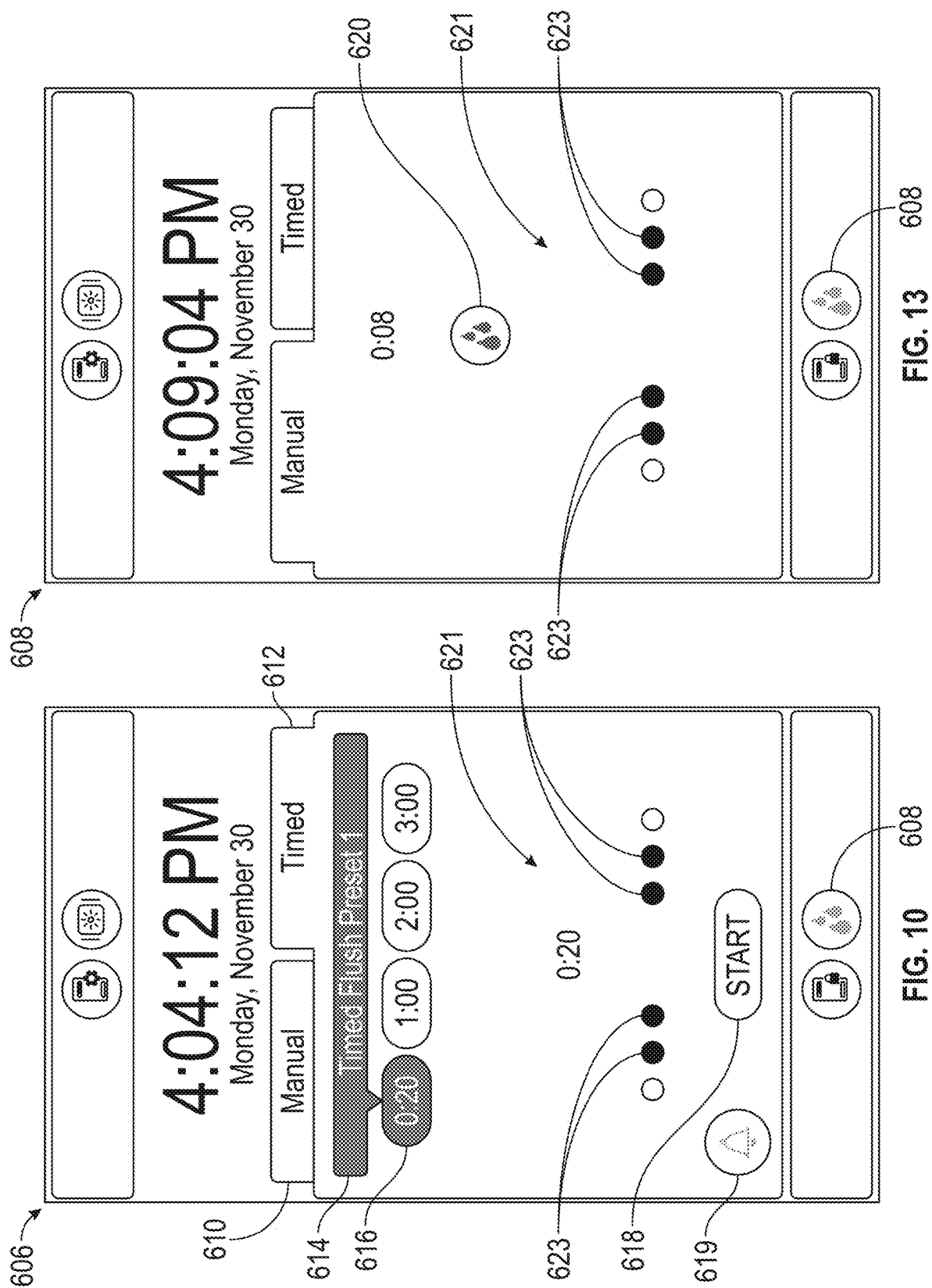

AUTOMATIC ACTIVATION OF FLUSHING MODE IN DENTAL SYSTEMS

BACKGROUND

Dental delivery systems provide the physical connections for delivering air, water, electrical power and/or data to dental handpieces and other similar devices that practitioners use in carrying out dental treatments for patients. A control head of a dental delivery system typically has multiple defined positions for receiving multiple handpieces, because a typical treatment procedure may involve using two or more handpieces. At least some of the control head positions for handpieces have connections to sources of pressurized fluids, which are typically air and/or water.

Handpieces that use water, either to be supplied to a treatment site or as a coolant for a handpiece, have waterlines that may be flushed after each patient visit. Representative types of handpiece waterlines that may be flushed include those which supply dental syringes, air-driven handpieces (high speed, low speed), electrically driven handpieces, surgical handpieces, hygiene handpieces, ultrasonic handpieces, and others. The handpiece waterline may be one component of a physical connection between the handpiece and the control head that also provides air, data, electrical power, etc. The water supplied through the waterlines may be sourced from a direct connection to the building water supply or from an independent bottle water system (sometimes referred to as a self-contained water system).

Flushing of waterlines, which is typically done with water, is carried out to reduce the risk of spreading infectious material from the oral cavity that may have been inadvertently drawn into the waterline from the handpiece, by using the water to flush or otherwise discharge any such material from the waterline, such as into a sink or other suitable location for safe disposal.

Such flushing of waterlines (and any attached handpieces) can be carried out manually, but requires that coordinated movements are executed precisely and quickly, typically during an interval of a few minutes between patient visits. It would be desirable to provide for handpiece waterline flushing that can be initiated automatically for multiple handpieces, can be carried out more quickly with fewer manipulations and greater flexibility, and can provide increased assurance that the flushing has been completed properly.

SUMMARY

Described below are various methods and apparatus for automatically initiating a flushing mode in a dental delivery system.

According to a first method implementation, automatically initiating a dental handpiece waterline flushing mode comprises detecting whether at least first and second handpiece waterlines from a plurality of handpiece waterlines are removed from respective first and second waterline rest positions of a control head for the dental delivery system, determining that no additional dental handpiece waterline which is flushable remains in a waterline rest position of the control head for the dental delivery system, and automatically initiating the dental handpiece waterline flushing mode for the first and second dental handpiece waterlines. After the waterline flushing mode is initiated or entered, then flushing can be started by an action from the user (such as, e.g., actuating a control or touchscreen element, or another type of actuation/activation).

Automatically initiating the dental handpiece waterline flushing mode can comprise updating a display to indicate that the dental handpiece waterline flushing mode is entered, to indicate that the first and second dental handpiece waterlines are removed from the respective first and second waterline rest positions, to indicate that a timed flushing mode has been entered and/or to indicate that a manual flushing mode has been entered. The display can be configured to indicate multiple predetermined flushing time periods that can be selected and/or a time remaining in the selected flushing mode.

Automatically initiating the dental handpiece waterline flushing mode can comprise configuring a control to receive a manual input from the user to begin flushing and/or updating a display to indicate a control element on a touchscreen receptive to a manual input from the user to begin flushing.

According to another implementation, a dental delivery system configured for automatic initiation of handpiece waterline flushing mode comprises multiple dental handpiece waterline rest positions, including at least a first handpiece waterline rest position and a second handpiece waterline rest position configured for access by a user, at least a first detector configured to detect if the first handpiece waterline rest position is not occupied by a first handpiece waterline and a second detector configured to detect if a second handpiece waterline rest position is not occupied by a second handpiece waterline, and a controller connected to at least the first detector and the second detector in a control circuit. The controller is programmed to automatically initiate a handpiece waterline flushing mode if the first and second detectors indicate that the first and second handpiece waterline rest positions, respectively, are unoccupied.

The controller can be programmed to determine if the first handpiece waterline and the second handpiece waterline are for use with flushable handpieces, such that handpiece waterline flushing mode is only initiated if the first and second handpiece waterlines are for use with flushable handpieces.

The controller can be programmed to receive handpiece identification information from a memory location. The handpiece identification information can specify whether the first handpiece waterline rest position and the second handpiece waterline rest position are designated for connection to first and second flushable handpieces, respectively.

The dental delivery system can include a display. The display can be configured to indicate that the handpiece waterline flushing mode has been initiated, whether the first and second handpiece waterline rest positions are occupied, to change in appearance to indicate that the first handpiece waterline has been moved from the first handpiece waterline rest position or the second handpiece waterline has been moved from the second handpiece waterline rest position, to indicate that the waterline flushing mode is a timed flushing mode or a manual flushing mode, and/or to indicate a user-selectable control element operable to begin the waterline flushing mode.

At least one of the first detector or the second detector can comprise a switch having a biased contact element configured to contact the respective handpiece waterline (or handpiece tubing) when the respective handpiece waterline is removed from or returned to the respective rest position. The switch can be coupled to a handpiece holder and configured to contact a side surface of a respective one of the handpiece waterlines (or handpiece tubings) received in the handpiece holder. The switch can be mounted to a whip arm that movably supports one of the first and second handpiece waterlines, and is configured to change states upon detecting that the whip arm has been moved to a predetermined position to indicate that the respective waterline supported by the whip arm has been moved out of its rest position.

The foregoing and other objects, features, and advantages of the disclosed technology will become more apparent from the following detailed description, which proceeds with reference to the accompanying figures.

BRIEF DESCRIPTION OF THE DRAWINGS

FIG. 10 is a drawing of the graphical user interface showing that a timed waterline flushing mode has been entered but not initiated, and also showing the handpiece positions (six total) and flush-eligible handpiece positions (four of the six total).

FIG. 13 is a drawing of the graphical user interface showing that a manual waterline flushing mode has been entered.

DETAILED DESCRIPTION

Described below are new methods and apparatus that provide for automatically initiating (or entering) a flushing mode for flushing dental handpiece waterlines (as well as any dental headpieces attached to the dental handpiece waterlines), which is carried out using a control head of a dental delivery system.

Figure 1:
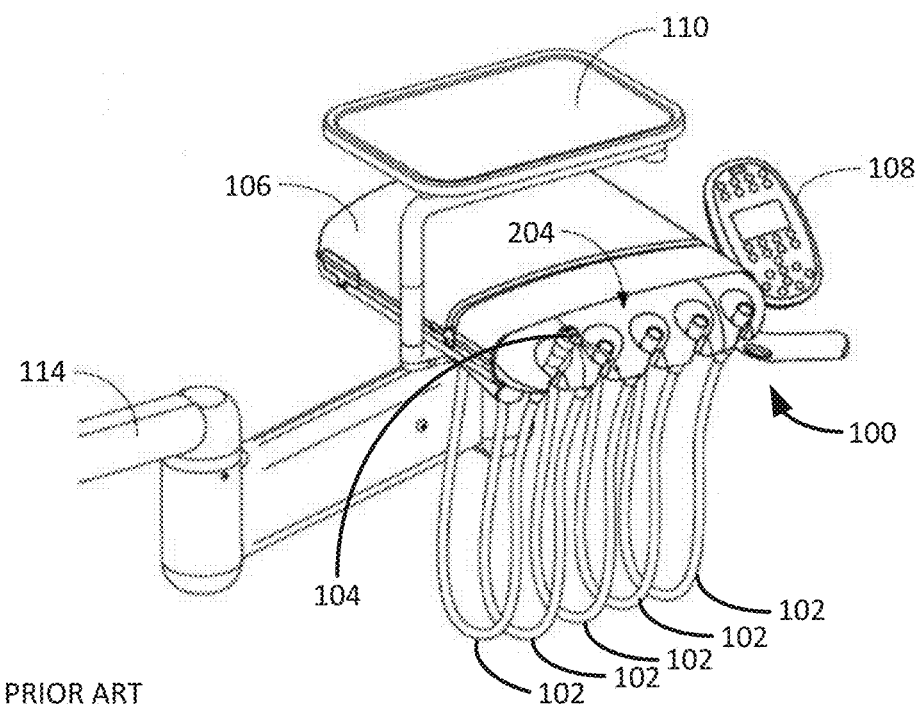
FIG. 1 is a perspective view of a representative delivery system of one common type.

FIG. 1 is a perspective view of a commercially available dental delivery system having a control head 100. Multiple handpieces, e.g., such as five handpieces in the example of FIG. 1, can be connected by respective handpiece tubings 102 to the control head 100 so that fluids such as water and air, electrical power and/or data can be supplied as appropriate to or through the handpieces for treating patients. Each handpiece tubing 102 includes at least one path, but typically multiple separate paths, for one or more fluids, electrical power and/or data, with the multiple paths being arranged together within the tubing for convenience in handling and cleaning. The fluid paths are typically formed of individual tubing segments or as individual channels in a multi-channel construction. The electrical power paths are typically wired or cabled connections. The data connections are typically wired or cabled connections.

As some examples, pressurized air can be provided for powering or cooling a handpiece. Pressurized air can also be provided for cooling a tooth or other treatment area and removing debris. Pressurized water can be provided for cooling a tooth or other treatment area and/or removing debris. Electrical power can be provided to power a handpiece. Data can be transferred to communicate information about the handpiece, its use, etc.

Of particular interest here are fluid paths in handpiece tubings through which water is supplied to handpieces, which are referred to herein as waterlines. In some instances, "waterline" as used herein can refer to the handpiece tubing with which the waterline is associated.

As a first example, a conventional dental syringe 104 used to provide air and water through the syringe's distal end is shown occupying a first position, which is defined as Position 1. The dental syringe 104 in Position 1, and its handpiece tubing assembly 102 as illustrated, can be described as occupying a "rest position" (i.e., not in operation). Similarly, the handpiece tubings 102 for Positions 2-5 (which are shown without handpieces attached), are also in respective rest positions. Thus, the waterline within the handpiece tubing 102 for the dental syringe 104 in Position 1, as well as any waterlines present within the handpiece tubings 102 in Positions 2-5, can also be described as occupying respective "rest positions." Each rest position can be further defined in connection with the status of a switch or indicator, as described below in more detail. For the control head 100, the rest positions are also sometimes referred to as "holder positions" because the physical configuration includes openings shaped to hold the handpiece tubings and any attached handpieces in position.

For the handpiece tubings 102 for Positions 2-5 shown without attached handpieces, the handpiece tubings can terminate at a handpiece nut or swivel, as is described below in more detail. In some control heads, only some of the handpiece positions have corresponding waterlines for supplying fluids (sometimes referred to as the "block positions"). Other handpiece positions can be assigned for handpieces that do not require any fluid connection (e.g., a handpiece requiring only an electrical connection). For purposes of the following description, it is assumed that the handpiece tubings for Positions 2-5 each include a respective waterline, and the following references to a handpiece waterline generally include its respective, surrounding handpiece tubing, as is clear from the specific context.

As illustrated, the control head 100 has a housing 106 that defines a space for housing lines for water, air, optional other fluids, data and electrical power, and control elements for fluid and electrical circuits and their interconnections, including valves, solenoid valves, a control block, one or more circuit boards, one or more controllers or microprocessors, and other components.

A touchpad 108 (or other input/output device(s)) provides a user interface by which the user can view status information, instructions, warnings, etc. and with which inputs can be made, as described in further detail below. A movable tray 110 can be located above the control head for easy access by the user. One or more movable arm sections 114 can support the control head in a desired position relative to the patient, typically lying prone in a treatment chair, and a practitioner, typically seated next to the dental chair.

Figure 2:
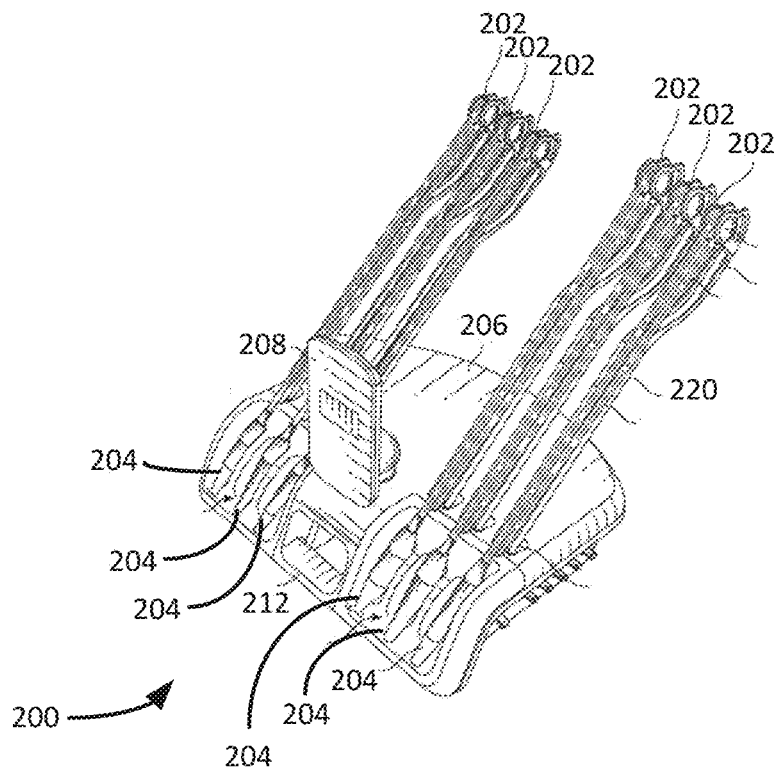
FIG. 2 is a perspective view of another representative delivery system according to another common type.
Figure 3:
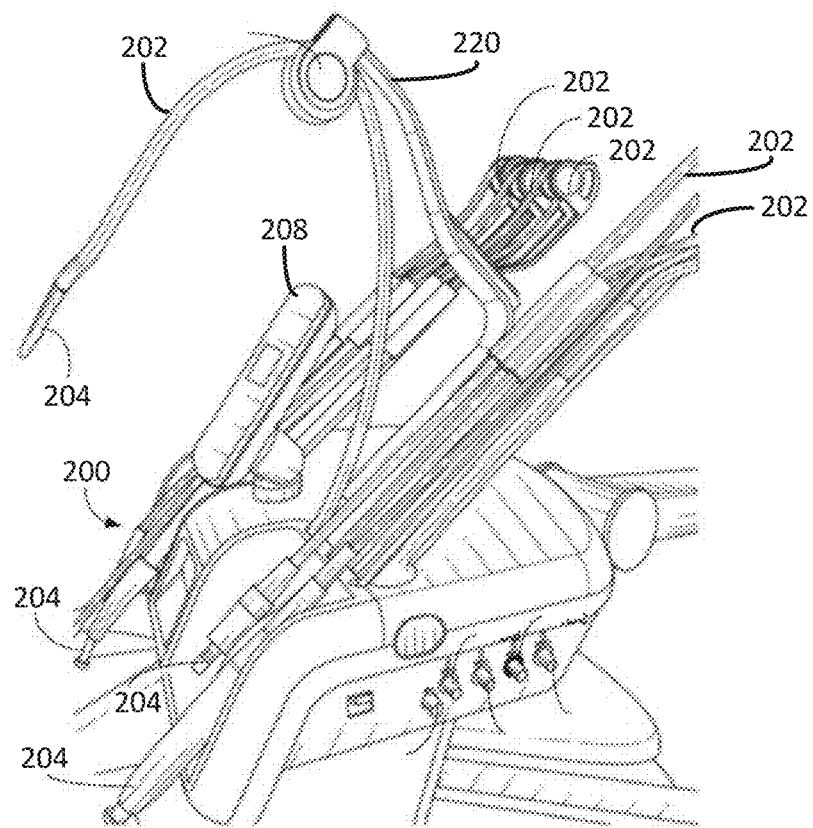
FIG. 3 is another perspective view of the delivery system of FIG. 2 showing one of the handpieces, which is connected by a handpiece tubing (including a handpiece waterline) that is supported by a whip arm, moved out of its rest position.

The dental delivery system of FIG. 1 is sometimes referred to as a "traditional" dental delivery system (having hanging handpiece tubings). An alternative dental delivery system, which is sometimes referred to as a Continental®-type delivery system (having handpiece tubings supported by whip arms), is illustrated in FIGS. 2 and 3. In the example of FIGS. 2 and 3, there are six handpiece positions, Positions 1-6, defined for a control head 200. In the illustrated implementation, there is a handpiece tubing 202 for each of the Positions 1-6. As described above, each handpiece tubing 202 contains one or more paths for air, water, electricity and/or data. As also described above, it is assumed for this description (although it is not a requirement) that there is a handpiece waterline in each handpiece tubing 202. Thus, the handpiece tubings 202 are referred to handpiece waterlines 202 in the following description. In the example of FIG. 2, each of the handpiece waterlines 202 is shown connected to a corresponding handpiece 204. Each of the waterlines 202 is supported by a hinged whip arm 220 that is biased into its rest position as shown in FIG. 2.

In FIG. 2, each of the handpieces 204, and correspondingly, each of the respective handpiece waterlines 202, is in a rest position. In FIG. 3, the handpiece 204 in Position 4 is shown moved out of its rest position with its waterline 202 supported along a portion of the whip arm 220, which has been bent forward at its hinge. As described above for FIG. 1, the status of the handpiece 204/handpiece waterline 202 being out of its rest position can be further defined in connection with a state of a switch, such as a switch positioned to change states when the whip arm is bent forward by a predetermined angle or distance, as is described in further detail below.

The control head 200 can have a housing 206 and a touchpad 208, similar to the housing 106 and touchpad 108 described above for the control head 100. The control head 200 can also have a handle 212 for moving the control head to a new position.

In the implementations described herein, the terminology "dental delivery system" refers to the apparatus that provides the physical connections for delivering air, water, electrical power and/or data to dental handpieces and other similar devices that practitioners use in carrying out dental treatments for patients. A dental delivery system typically includes a control head as a physical and/or logical component thereof. In some cases, assistant's instrumentation, which is a form of dental delivery system, does not include a control head per se.

Dental delivery systems can be a part of or associated with other devices and/or components used in the dental environment. For example, a "dental treatment center" and other similar terminology can refer to the dental delivery system as well as the patient chair, cuspidor, support center, operating light, etc., as well as supporting arms and connections between the components. In some cases, a part of a control circuit for controlling flushing operations, which could include a primary control or a redundant control, could be associated with the support center, or at another location within the overall treatment center.

Flushing is one type of cleaning procedure that is carried out with certain types of dental handpiece waterlines (and, in some cases, the dental handpieces attached to the waterlines). "Flushing" refers to conveying a flow of liquid under pressure, which is typically water or treated water, through the waterlines and any attached handpieces. In dentistry, flushing can be conducted for different purposes, depending upon the cleaning objectives. According to one type of flushing that is carried out relatively frequently and for relatively short periods, handpiece waterlines are typically flushed immediately after each patient visit (generally prior to connecting freshly sterilized handpieces to the handpiece waterlines for the next patient). The flushing action after a patient procedure discharges any water remaining in the waterlines, including water that may have been retracted from the handpiece or oral cavity into the waterline, and thus reduces the risk that infectious material from the patient is spread to others.

Additionally, when a waterline treatment chemical is used in water supplied to the waterlines (sometimes referred to as "dental unit water"), flushing replenishes the water in the lines with fresh treated water to help ensure maximum potency of the chemical agent in the waterlines. Periodically, more aggressive chemical solutions may be flushed through the dental unit water system that are intended to remove any bacterial biofilm that may have developed on the internal surfaces thereof. Flushing with water is used to purge chemical agents from the water system after the solution has performed its cleaning function.

Only some kinds of handpiece tubings are typically subjected to flushing, and these (and the respective handpieces) are referred to herein as "flushable" or "flush-eligible." For example, only tubing assemblies for handpieces that convey a liquid are typically flushable. Such handpiece tubings may be assigned to only selected positions within the control head Representative types of handpiece waterlines that may be flushed include those that supply dental syringes, air-driven handpieces (high speed, low speed), electrically driven handpieces, surgical handpieces, hygiene handpieces, ultrasonic handpieces, and others.

A dental syringe, which is used to dispense water and air, and thus has an associated line for providing water, may or may not be designated as a flushable handpiece. If the dental syringe is of a type that supplies water only upon actuation of a manual control on the dental syringe itself (e.g., with a water "button"), then the syringe is typically not designated as a flushable handpiece. If the dental syringe is of a type by which control of water flow can be accomplished with the control head or other control element in the overall system, then the dental syringe could be included as a flushable handpiece.

During a typical patient visit, multiple handpieces may be used in treating the patient. Typically, multiple flush-eligible handpieces are used, and thus the waterlines for these handpieces are normally flushed before a next use. The recommended flushing time per handpiece waterline may be relatively short, such as 20-30 seconds (or even up to two minutes), but if two, three, four or five handpiece waterlines need to be flushed, then time can be saved if the flushing of multiple handpieces occurs concurrently, or even sequentially (based on a reduction of required user actions).

The entire system of waterlines that supplies water to a handpiece includes the exterior tubing portion extending from the control head to the handpiece nut or other termination, as well as an internal or enclosed tubing portion within the control head and extending upstream to the source of water. Waterlines are understood to include intermediate flow control and other components that water passes through on its route from the source to the termination of the waterline.

As described, the new methods and apparatus allow for detecting if at least two handpiece waterlines for flushable handpieces are removed from their rest positions, and if no additional waterlines for flushable handpieces remain in rest positions, then automatically initiating or entering a flushing mode for the handpiece waterlines. Among other benefits, the new methods and apparatus save time for practitioners in the crucial periods between patient visits and help to ensure that all qualifying handpiece waterlines are flushed as appropriate. Also, the described approaches minimize the number of "touches" a user must make to carry out tasks, which eases the overall process and is consistent with promoting hygiene.

In described implementations, the flushing mode is not automatically initiated (or enabled), i.e., the actual flushing with water cannot begin, until all qualifying handpiece waterlines are moved from their rest positions. This acts as a check for the user to ensure that the user does not complete flushing of some waterlines while neglecting to flush at least one other waterline, which is a possible error in current flushing routines.

Even if flushing of multiple handpieces is carried out sequentially instead of concurrently under certain conditions, such as to maintain a high flushing flow rate, then there are still benefits in having the sequence of operations programmed automatically to minimize the number of actions a user must take.

Further, the practitioner can be guided through steps by indications on a display, including one or more of the following: (a) an indication that all handpiece waterlines are in rest positions (i.e., no handpiece is in use); (b) an indication that a first handpiece waterline has been moved out of its at rest position (e.g., the display can change to indicate an operating mode for the first handpiece); (c) an indication that a second handpiece waterline has been moved out of its at rest position (the display changes from the operating mode for the first handpiece to a different mode); (d) an indication that the flushing mode has been automatically entered (e.g., if the first and second handpieces are flushable handpieces, and if there is no additional flushable handpiece remaining in an at rest position); (e) an indication that a fault or error has occurred (e.g., if certain non-flushable handpiece waterlines are moved out of their rest positions).

Figure 5:
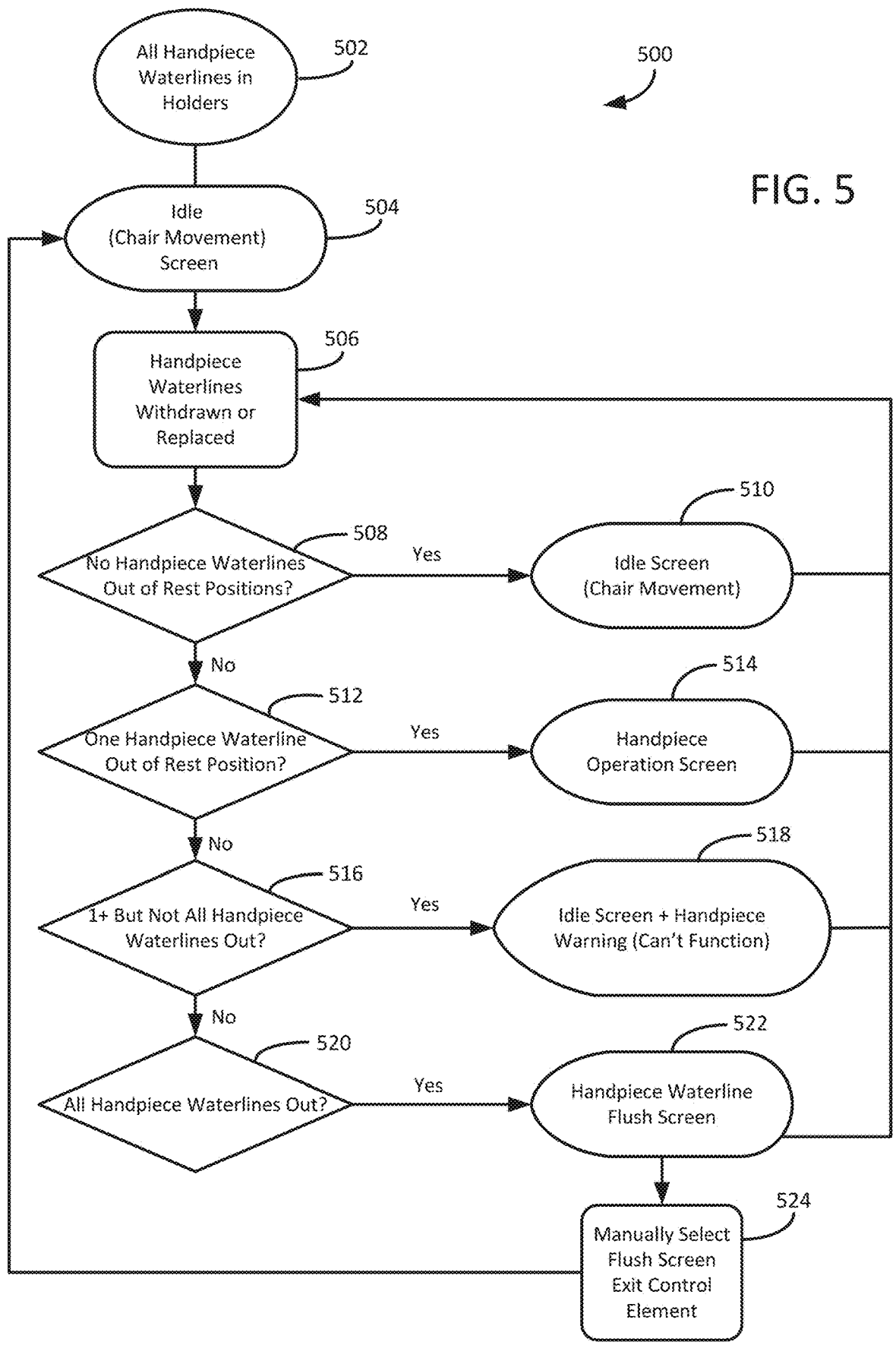
FIG. 5 is a flow chart of a representative method of automatically initiating a flushing mode in a dental delivery system.

FIG. 5 is a flow chart showing steps of a representative method 500 of automatically initiating a flushing mode. At process block 502, it is assumed that all handpiece waterlines (with or without attached handpieces) are in their respective rest positions.

Figure 7:
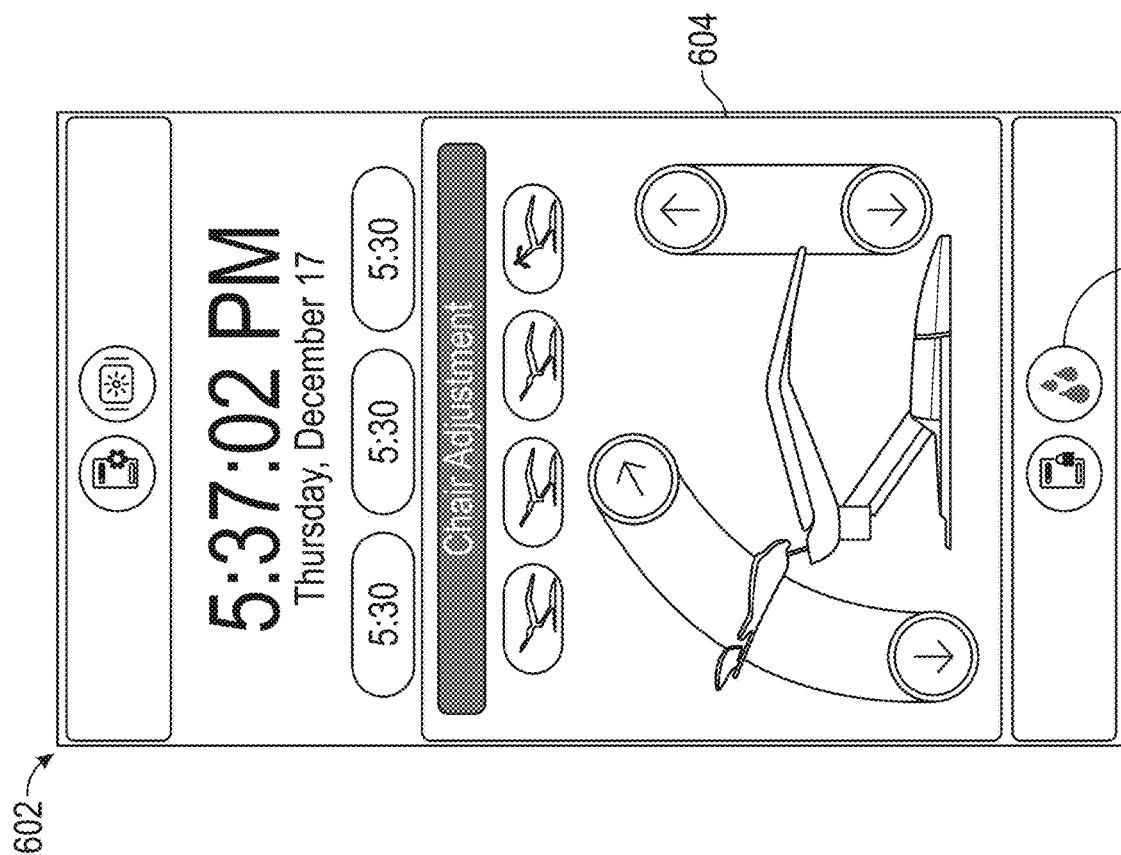
FIG. 7 is a drawing of a representative graphical user interface, such as may be displayed on a touchscreen used with a delivery system, showing status information for the dental delivery system and a treatment chair system, including a representative chair adjustment screen with inputs for the user to adjust the position of the treatment chair.

At process block 504, a visual indication that the handpiece waterlines are in the rest positions (idle positions) can be displayed via a graphical user interface on a display screen. The display screen can be a touchscreen of a touchpad similar to the touchpads 108, 208 and/or a display device of a different type and/or location. According to one implementation, the indication on the display defaults to a chair adjustment function when all handpiece waterlines are in their rest positions, thus indicating at least indirectly that none of the handpiece waterlines has been moved from its rest position. For example, FIG. 7 is a display of status information for the dental delivery and treatment chair systems showing a representative chair adjustment screen 602 with inputs 604 for the user to adjust the position of the treatment chair.

At process block 506, it is determined if a handpiece waterline has been moved or withdrawn from its rest position. (As described, the handpiece waterline may have an attached handpiece, so this determination may also be used in certain circumstances to indicate that the handpiece has been withdrawn or is in use.)

At process block 508, if it is determined that no handpiece waterline has been moved out of its rest position, then the display does not show any updated handpiece waterline status information (e.g., the display can continue to show the chair adjustment screen as indicated at process block 510).

Figure 8:
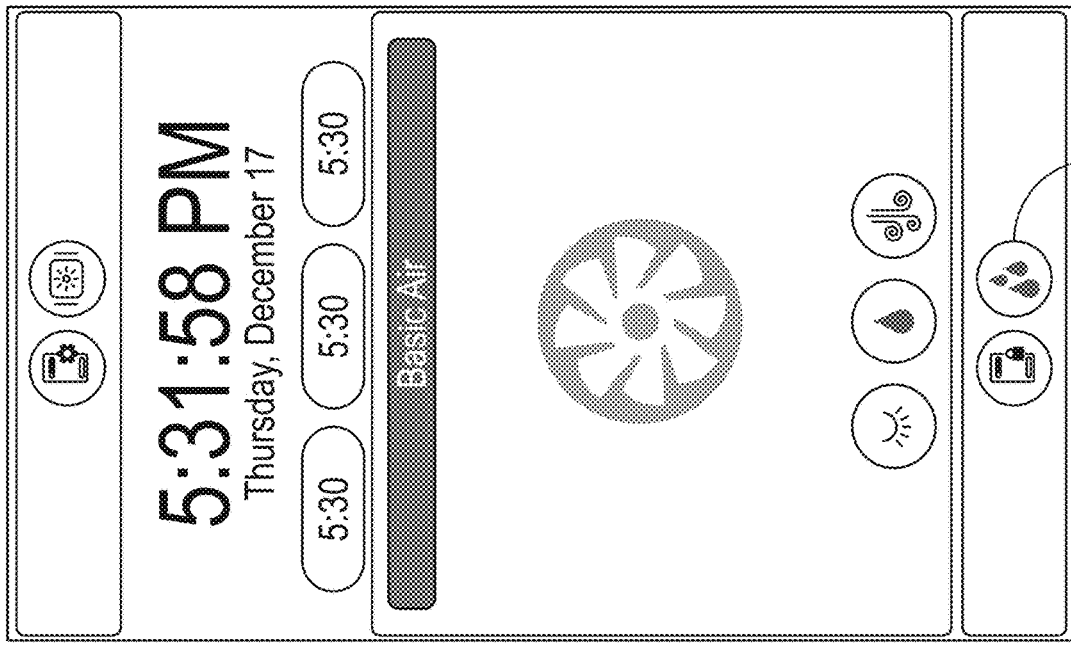
FIG. 8 is a drawing of the graphical user interface of FIG. 7 after a first handpiece waterline (tubing) has been moved from its rest position, showing a handpiece operation screen for a basic air handpiece.

At process block 512, if it is determined that a first handpiece waterline has been moved from its rest position, then the display can be configured to indicate an operation screen for the first handpiece at process block 514. For example, as shown in FIG. 8, the display can be configured to show a handpiece operation screen for a basic air handpiece.

In some implementations, the handpiece operation screen is selected to correspond to the first handpiece identification information previously entered as initial settings for the first position (and the associated first waterline).

Figure 15:
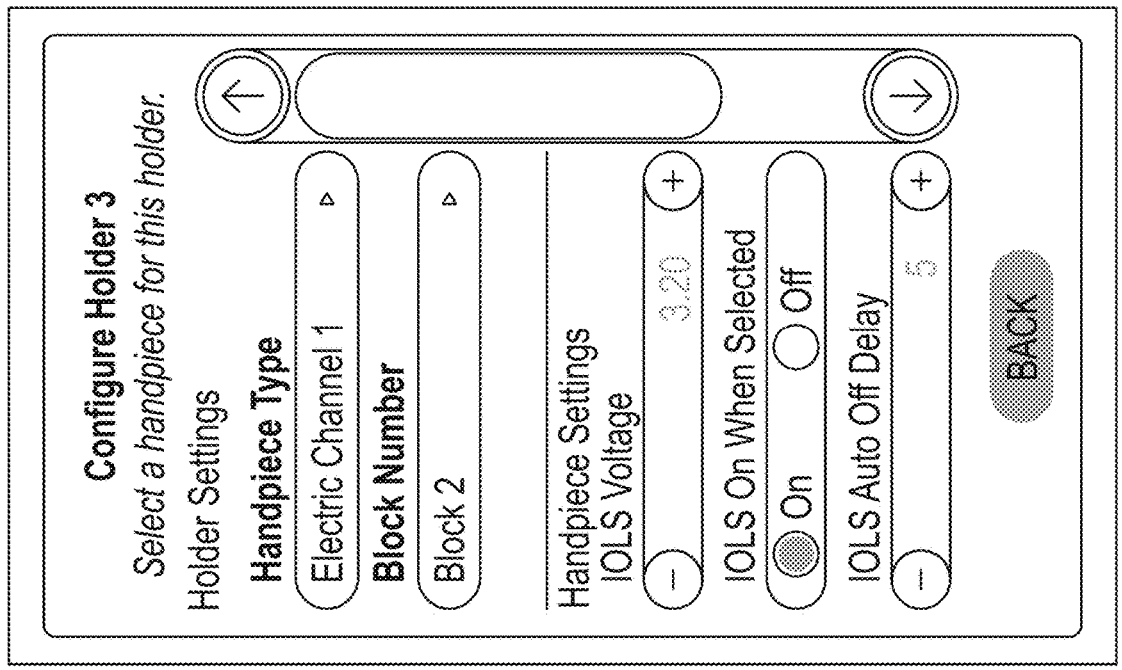
FIG. 15 is a drawing of the graphical user interface showing an initial settings screen for a representative handpiece holder.
Figure 14:
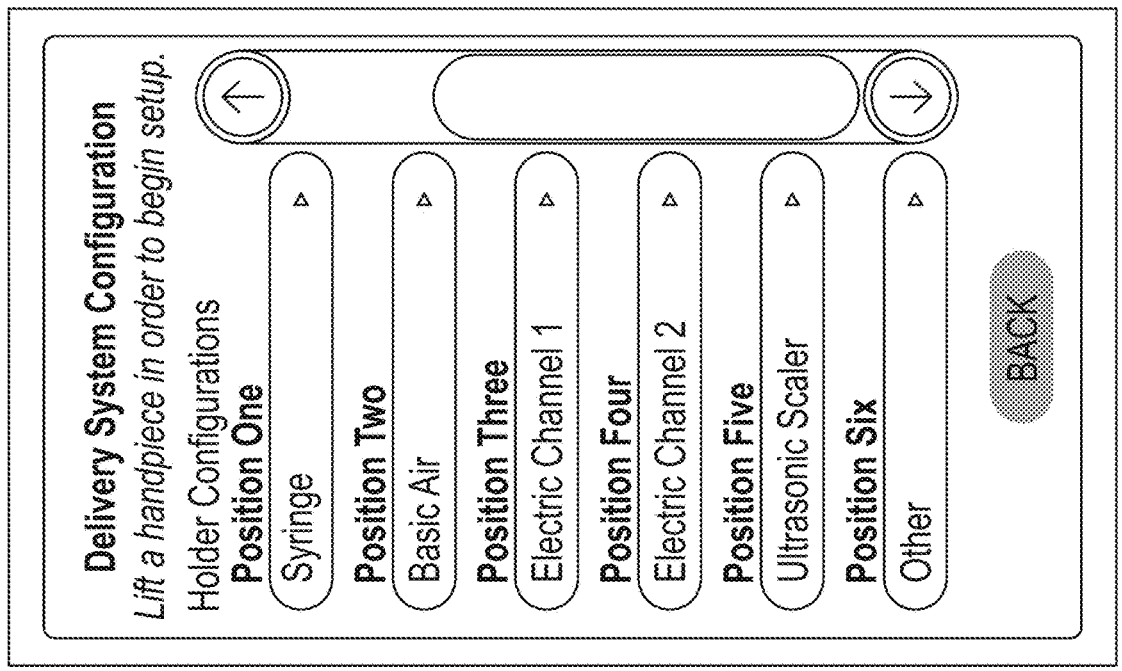
FIG. 14 is a drawing of the graphical user interface showing an initial settings screen for designating the handpiece type for the various handpiece waterlines.

As a related example, FIGS. 14 and 15 show representative screens by which the initial settings are entered. FIG. 14 shows the specified handpiece type for Position Three (Holder 3), which has been designated as an Electric Channel 1 handpiece type. FIG. 15 shows the Block Number specified for Holder 3 as Block 2, which designates that an electronically controlled solenoid valve in block position 2 has been plumbed to the Holder 3 handpiece waterline.

Thus, as also indicated in FIG. 15, in some implementations selected handpiece waterlines are individually fed via respective electronic solenoid valves. In other implementations, one electronically activated flush valve can be used in combination with a pneumatically activated valve and switch for each waterline. Other arrangements of valving and/or control elements are also possible to achieve the described automatic flush mode initiation.

Figure 9:
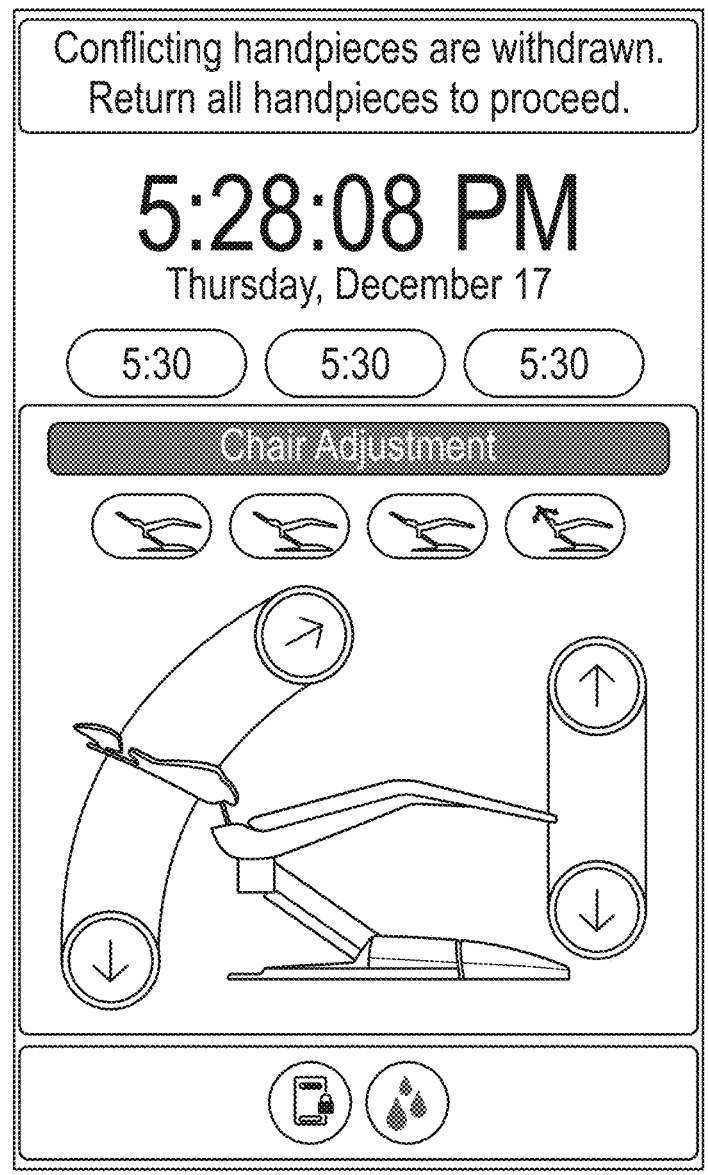
FIG. 9 is a drawing of the graphical user interface after first and second handpiece waterlines (tubings) have been moved from respective positions, but at least one additional flushable handpiece remains in its at rest position, so that automatic initiation of the flushing mode is blocked, a "conflicting handpieces are withdrawn . . . " message is displayed and the display changes from the handpiece operation screen to the chair adjustment screen.

At process block 516, if it is determined that a second handpiece waterline has been moved from its rest position, but that at least one more handpiece waterline remains in its rest position, then an indication that an error or fault has occurred (i.e., the system cannot function) is shown at process block 518. For example, the display can be configured as shown in FIG. 9, which includes the message "Conflicting handpieces are withdrawn. Return all handpieces to proceed." In this case, it is assumed that neither the first handpiece nor the second handpiece can be allowed to function because the other is also out of its rest position, so no operation screen is displayed. Also, because at least one more handpiece waterline remains in the at rest position, then absent special conditions, the condition for automatic initiation of the flushing mode requiring that all flush-eligible handpiece waterlines are out of their rest positions is not met.

At process block 520, if it is determined that first and second handpiece waterlines have been moved from their rest positions, and that any other handpiece waterlines corresponding to other flushable handpieces have been moved from their respective rest positions, then the flushing mode is automatically entered or initiated. At process block 522, the display is configured to show that the flushing mode has been entered.

As a first example, the display can be configured as shown in FIG. 10 to indicate that a timed waterline flushing mode has been entered. As a second example, the display can be configured as shown in FIG. 13 to indicate that a manual waterline flushing mode has been entered. Optionally, the system can be configured to return to the timed waterline flushing mode or the manual waterline flushing mode according to whichever was used previously.

Referring again to FIG. 10, in the illustrated implementation, the user can toggle between the timed and manual modes by selecting one of the associated tab elements 610, 612. Within the timed mode, there can be multiple Timed Flush Preset durations 614, such as the indicated durations of 20 seconds, 1 minute, 2 minutes, 3 minutes, and so on. In the illustrated implementation, the preset for 20 seconds ("0:20") has been selected 616, and the remaining time of 0:20 is shown below. To start the flushing for 20 seconds, the user presses the START button 618. Other activation techniques, including voice activation, could be used to start the flushing and/or for other inputs described herein.

The handpiece positions on the control head are indicated on the display, such as by the circles 621. In the illustrated implementation, there are six handpiece positions (Positions 1-6), and the middle four positions (Positions 2-5) have waterlines for flush-eligible handpieces. The flush-eligible positions are indicated by filled circles 623. As each flush-eligible handpiece is moved out of its rest position, its corresponding filled circle can be caused to change appearance, such as from grey to green (not shown). This can assist the user in verifying which of multiple handpieces have been withdrawn and which of the remaining handpieces need to be withdrawn.

Figure 12:
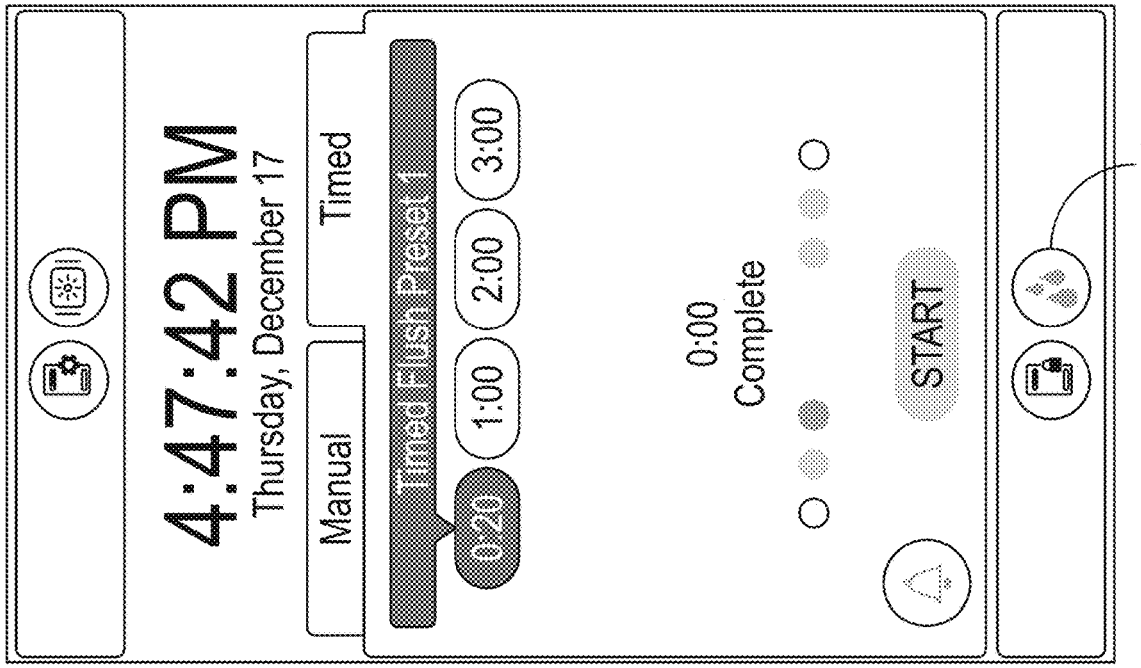
FIG. 12 is a drawing of the graphical user interface of FIG. 11 showing that the flushing is completed and that some but not all of the handpiece waterlines have been returned to their at rest positions.
Figure 11:
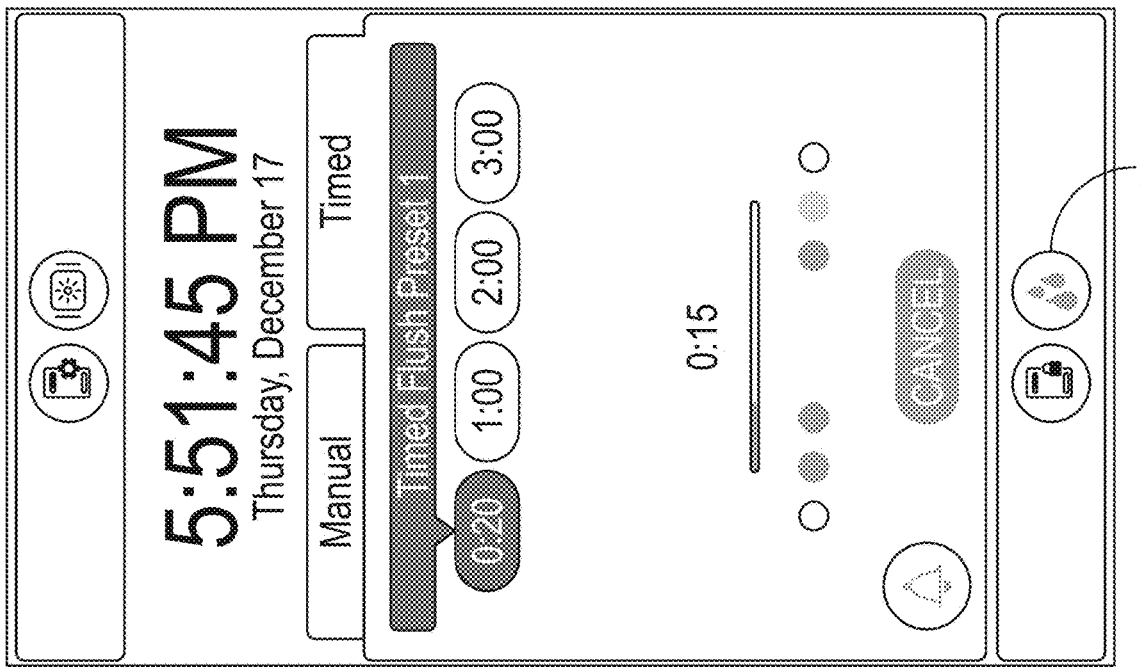
FIG. 11 is a drawing of the graphical user interface of FIG. 10 after the flushing has been initiated and showing a remaining time.

FIG. 11 shows the display indicating that the flushing has been started, and that 15 seconds remain. If necessary, the user can select the CANCEL control element to halt the flushing process. FIG. 12 shows the display indicating that the flushing is concluded, and that the handpiece waterlines for Positions 2, 4 and 5 have been returned to their rest positions, but the handpiece waterline for Position 3 is still out of its rest position.

An audio indicator 619 can be set to provide an audio indication, such as an alarm or chime to indicate that the selected timed flush has completed. In addition, or alternatively, a message on the screen can indicate "Complete." This is advantageous because a user can turn their attention to completing other tasks while awaiting completion of a flush (particularly one of a longer duration) that is left running in a sink or other vessel, but the user will observe a positive a message upon returning indicating that the flush has been completed.

Referring again to FIG. 13, an example of the user interface when the manual flushing mode has been initiated is shown. In the illustrated implementation, with the waterlines for the flushable handpieces out of their rest positions and positioned as desired, the manual flushing mode is controlled by the user selecting a flushing control element 620. As indicated, the user has continued pressing the control element 620 for 8 seconds thus far. The filled circles 623 can have the same functionality as described above, i.e., changing in appearance as each associated waterline is moved out of its rest position or returned to its rest position.

At process block 524, the flush mode is exited, and the process flow returns to process block 504 with the chair adjustment screen being displayed. The flush mode can be exited by a return of any of the withdrawn waterlines to its respective rest position, which is sometimes referred to as an "auto exit." Exiting the flush mode automatically saves the user steps, especially while the user is potentially handling multiple handpiece waterlines. In addition, a manual control element selectable by the user to exit the flush mode can be provided. For example, a control element 608 as shown in FIGS. 10-13 can be configured, while the flush mode is active, to exit the flush mode if selected by the user. Other exit conditions, such as expiration of a predetermined time, can also be defined.

The control element 608 itself, or other similar elements, can also be configured to perform other functions. For example, the control element 608 can be configured to change in appearance, such as by changing color, from its appearance in FIG. 7, FIG. 8 or FIG. 9 (e.g., grey) to a different appearance in FIGS. 10-13 (e.g., green) to indicate when the flushing mode is active (whether the flushing mode is automatically initiated, as described above, or manually initiated as described below).

In some implementations, the flushing mode that is automatically initiated as described above is an option included with other manually initiated flushing functionality. For example, the control element 608 as shown in FIG. 7, 8 or 9, or another control element, can be configured as a user selectable control selectable by the user to enter flush mode manually at any time.

When initiated manually, the flush mode may be configured to allow the user to begin flushing without meeting one or more of the constraints described above. For example, when the flush mode is entered manually, it may be possible for the user to flush one or more waterlines when one or more other flushable waterlines remain in their rest positions. The control element 608 can then be selected again to exit the flush mode.

Figure 4:
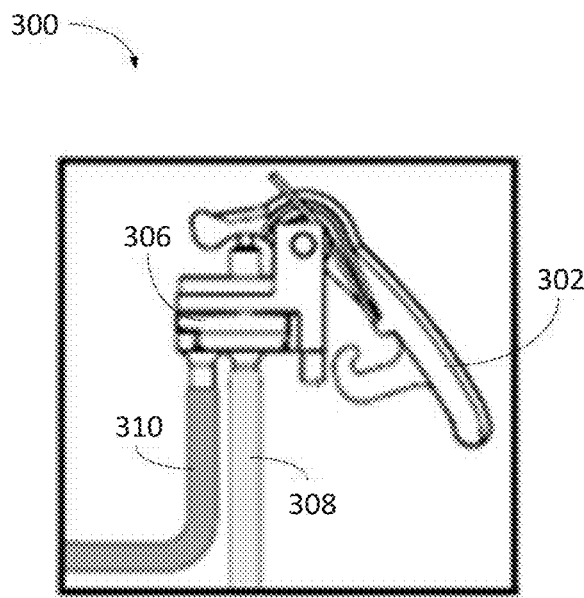
FIG. 4 is a schematic view of one type of switch used to detect whether a handpiece waterline (or handpiece tubing) is present in its rest position.

FIG. 4 is a drawing showing a switch 300 of one type suitable for detecting or signaling whether a handpiece tubing, and correspondingly, whether a handpiece waterline within that handpiece tubing, has been moved from its rest position. The switch 300 (or detector) is installed at each of handpiece Positions 1-5 in the control head 100 of FIG. 1. The switch 300 has a lever 302 that contacts a side of the handpiece tubing near its termination when the handpiece tubing is present in its rest position in the holder (not shown), and then moves to the position shown in FIG. 4 when the handpiece tubing is removed from the rest position or withdrawn. The lever 302 can be spring-biased to move to the position shown in FIG. 4. When the lever 302 changes positions as described, a pneumatic switch 306 between the pneumatic lines 308 and 310 changes states, and a pneumatic signal is generated. The pneumatic signal is fed back to a control board. In this way, the system detects when the handpiece tubings (and the associated handpiece waterlines) have been moved from their rest positions.

Instead of the pneumatic switch 300 or detector, it is also possible to use an electrical switch. Further, detectors of other types, such as ones using optical sensing, inductive sensing or capacitive sensing could also be used. Referring to FIG. 4, a switch similar to the switch 300 can be configured to detect when each whip arm 220 has been moved forwardly by a predetermined amount and/or to a predetermined position, thereby providing an indication that the handpiece tubing and the handpiece waterline (as well as any attached handpiece) have been moved out of the rest position.

Figure 6:
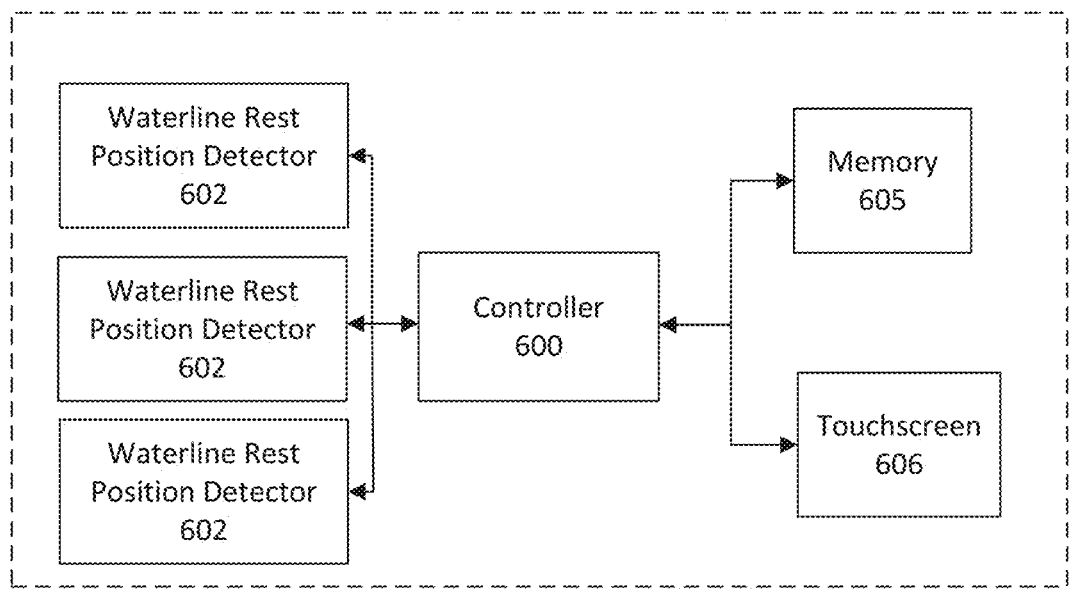
FIG. 6 is a schematic block diagram showing selected elements of a dental delivery system in which automatic initiation of a flushing mode can be implemented.

FIG. 6 is a schematic block diagram showing selected elements of a dental delivery system in which automatic initiation of a flushing mode can be implemented. A controller 600, which may include one or more microprocessors, is linked to waterline rest position detectors 602 for each waterline rest position of interest (in this example, there are three waterline rest positions of interest). One example of a suitable waterline rest position detector 602 is the switch 300, described above in connection with FIGS. 1 and 4. The waterline rest position sensor 602 is linked to the controller by pneumatic, wired and/or wireless connections. In connection with flushing, the controller 600 is programmed to carry out instructions consistent with the steps of the methods described herein, including as illustrated in FIG. 5. The controller 600 is linked to a memory 605. Among other data, the memory 605 can be configured to store handpiece identification data corresponding to each handpiece position and stored instructions. Handpieces that are deemed to be flushable are configured in initial settings (which can be subsequently updated at any time) to occupy handpiece positions within the delivery system that have waterlines to support the operation of those handpieces, such as providing water coolant while those handpieces are in use within the oral cavity. In turn, the waterlines for this subset of handpiece positions are identified as eligible for flushing. The controller 600 is programmed to update the touchscreen 606 as described above and to receive inputs from the user via the touchscreen 606. It would of course be possible to substitute for or supplement the touchscreen 606 with other I/O devices/approaches.

Although various preferred embodiments of the disclosure are shown and described, it is to be distinctly understood that this disclosure is not limited thereto but may be variously embodied to practice within the scope of the following claims. From the foregoing description, it will be apparent that various changes may be made without departing from the spirit and scope of the disclosure as defined by the following claims.

We claim:

1. A method for automatically initiating a dental handpiece waterline flushing mode in a dental delivery system, comprising:
   detecting whether at least first and second dental handpiece waterlines from a plurality of dental handpiece waterlines are removed from respective first and second waterline rest positions of a control head for the dental delivery system;
   determining if an additional dental handpiece waterline remains in a respective waterline rest position of the control head for the dental delivery system, and if so, further determining if the additional dental handpiece waterline is flushable or non-flushable; and
   automatically initiating the dental handpiece waterline flushing mode for the first and second dental handpiece waterlines if the additional handpiece waterline remaining in the respective waterline rest position is non-flushable and updating a display to indicate that the dental handpiece waterline flushing mode is initiated.

2. The method of claim 1, further comprising updating the display to indicate that the first and second dental handpiece waterlines are removed from the respective first and second waterline rest positions.

3. The method of claim 1, further comprising updating the display to indicate that a timed flushing mode has been entered.

4. The method of claim 3, wherein after the timed flushing mode has been initiated, further comprising displaying a time remaining in the timed flushing mode.

5. The method of claim 3, comprising updating the display to indicate multiple predetermined flushing time periods that can be selected.

6. The method of claim 1, further comprising updating the display to indicate that a manual flushing mode has been entered.

7. The method of claim 1, further comprising updating the display to indicate a control element on a touchscreen receptive to a manual input from the user to begin flushing.

8. The method of claim 1, further comprising automatically exiting the dental handpiece waterline flushing mode when the first dental handpiece waterline is returned to the first waterline rest position or the second dental handpiece waterline is returned to the second waterline rest position.

9. A dental delivery system configured for automatic initiation of handpiece waterline flushing mode, comprising:
   multiple dental handpiece tubing rest positions, wherein the multiple dental handpiece tubing rest positions comprise at least a first handpiece waterline rest position and a second handpiece waterline rest position, configured for access by a user;
   a controller programmed to determine if first and second handpiece waterlines corresponding to the first and second handpiece waterline rest positions, respectively, have been designated for use with flushable handpieces; and
   first and second detectors connected to the controller, the first detector being configured to detect if the first handpiece waterline rest position is unoccupied by the first handpiece waterline and the second detector being configured to detect if the second handpiece waterline rest position is unoccupied by the second handpiece waterline;
   wherein the controller is programmed to determine if any additional handpiece waterline rest positions are occupied, and wherein if at least a third handpiece waterline rest position is occupied, then the controller determines if the third handpiece waterline rest position is occupied by a flushable third handpiece waterline or a non-flushable third handpiece waterline,
   wherein if the controller determines that the third handpiece waterline occupying the third handpiece waterline rest position is non-flushable, then the controller is programmed to automatically initiate the handpiece waterline flushing mode for the first and second flushable handpiece waterlines, and
   wherein if the controller determines that the third handpiece waterline occupying the third handpiece waterline rest position is flushable, then the controller is programmed to prevent automatic initiation of the handpiece waterline flushing mode for the first and second flushable handpiece waterlines.

10. The dental delivery system of claim 9, wherein the controller is programmed to receive handpiece identification information from a memory location, and wherein the handpiece identification information specifies whether the first handpiece waterline rest position and the second handpiece waterline rest position are designated for connection to first and second flushable handpieces, respectively.

11. The dental delivery system of claim 9, further comprising a display, wherein the display is configured to indicate that the handpiece waterline flushing mode has been initiated.

12. The dental delivery system of claim 11, wherein the display is configured to indicate whether the first and second handpiece waterline rest positions are occupied.

13. The dental delivery system of claim 12, wherein the display is configured to change in appearance to indicate that the first handpiece waterline has been moved from the first handpiece waterline rest position or the second handpiece waterline has been moved from the second handpiece waterline rest position.

14. The dental delivery system of claim 9, further comprising a display, wherein the display is configured to indicate that the waterline flushing mode is a timed flushing mode or a manual flushing mode.

15. The dental delivery system of claim 9, further comprising a display, wherein the display is configured to indicate a user-selectable control element operable to begin the waterline flushing mode.

16. The dental delivery system of claim 9, wherein at least one of the first detector or the second detector comprises a switch having a biased contact element configured to contact the respective handpiece waterline or a handpiece tubing within which the handpiece waterline is received.

17. The dental delivery system of claim 16, wherein the switch is coupled to a handpiece holder and configured to contact a side surface of a respective one of the handpiece waterlines received in the handpiece holder.

18. The dental delivery system of claim 16, wherein the switch is mounted to a whip arm that movably supports one of the first and second handpiece waterlines, and wherein the switch is configured to change states upon detecting that the whip arm has been moved to a predetermined position to indicate that the respective waterline supported by the whip arm has been moved out of the first handpiece waterline rest position or the second handpiece waterline rest position, respectively.

19. The dental delivery system of claim 9, further comprising a third detector connected to the controller and configured to detect if the third handpiece waterline rest position is not occupied by a third handpiece waterline.

20. A control circuit for automatically initiating a dental handpiece waterline flushing mode in a dental delivery system, comprising:
at least one processor; and
memory linked to the at least one processor and having stored instructions for causing the at least one processor to perform a plurality of operations, including
detecting, from among a plurality of handpiece tubings, removed handpiece tubings that are removed from respective rest positions, the removed handpiece tubings comprising at least a first handpiece tubing removed from a first rest position and a second handpiece tubing removed from a second rest position,
detecting, from among the removed handpiece tubings, that the first handpiece tubing comprises a first flushable handpiece waterline and that the second handpiece tubing comprises a second flushable handpiece waterline,
determining if the plurality of handpiece tubings includes any handpiece tubing that has not been removed from the respective rest positions, and
for any handpiece tubing that has not been removed from one of the rest positions, determining if the handpiece tubing that has not been removed is a flushable waterline or a non-flushable handpiece tubing,
if the handpiece tubing that has not been removed from the rest position is a non-flushable handpiece tubing, then automatically initiating the dental handpiece waterline flushing mode for the first and second flushable handpiece waterlines and updating a display to indicate that the dental handpiece waterline flushing mode is initiated, and
if the handpiece tubing that has not been removed from the rest position is a flushable handpiece waterline, then preventing automatic initiation of the dental handpiece waterline flushing mode and updating the display to indicate that the dental handpiece waterline flushing mode has not been initiated.

\* \* \* \* \*